US010706653B2

(12) United States Patent
Yorkston (10) Patent No.: US 10,706,653 B2
(45) Date of Patent: Jul. 7, 2020

(54) WIRELESS ACCESS TAG DUPLICATION SYSTEM AND METHOD

(71) Applicant: Info Wise Limited, Wanchai, Hong Kong (CN)

(72) Inventor: Simon Yorkston, Paris (FR)

(73) Assignee: INFO WISE LIMITED, Wanchai Hong Kong (CN)

( * ) Notice: Subject to any disclaimer, the term of this patent is extended or adjusted under 35 U.S.C. 154(b) by 131 days.

(21) Appl. No.: 15/745,922

(22) PCT Filed: May 27, 2016

(86) PCT No.: PCT/AU2016/050420
§ 371 (c)(1),
(2) Date: Jan. 18, 2018

(87) PCT Pub. No.: WO2017/015698
PCT Pub. Date: Feb. 2, 2017

(65) Prior Publication Data
US 2018/0253922 A1    Sep. 6, 2018

(30) Foreign Application Priority Data

Jul. 24, 2015 (AU) .............................. 2015902950

(51) Int. Cl.
*G06F 21/44* (2013.01)
*G07C 9/00* (2020.01)
(Continued)

(52) U.S. Cl.
CPC ..... *G07C 9/00857* (2013.01); *G06K 7/10009* (2013.01); *G06Q 20/3278* (2013.01);
(Continued)

(58) Field of Classification Search
CPC ....... G06Q 20/34; G06Q 20/341; G06F 21/44
See application file for complete search history.

(56) References Cited

U.S. PATENT DOCUMENTS

| 5,666,412 A * | 9/1997 | Handelman .......... G06K 7/0004 |
| | | 235/382 |
| 2002/0020744 A1* | 2/2002 | Fukazawa ............ G06K 7/0013 |
| | | 235/437 |

(Continued)

FOREIGN PATENT DOCUMENTS

WO    2008145199 A1    12/2008

OTHER PUBLICATIONS

Antoniewicz, "ProxBrute: Taking ProxCard Cloning to the Next Level", pp. 1-14 (Year: 2011).*

(Continued)

*Primary Examiner* — Thaddeus J Plecha
(74) *Attorney, Agent, or Firm* — Cantor Colburn LLP (57) ABSTRACT

A wireless access tag duplication device, system and method is provided. The wireless access tag duplication system comprises: a wireless access tag reader; a wireless access tag writer; a processor, coupled to the wireless access card reader and the wireless access card writer; and a memory. The memory includes instruction code, executable by the processor, for: determining a first key of a first wireless access tag; determining remaining keys of the first wireless access tag using nested authentication and the first key; reading data of the first tag using the wireless access card reader, the first key and the remaining keys; and writing the data to a second tag using the wireless access card writer, the first key and the remaining keys.

19 Claims, 3 Drawing Sheets

(51) Int. Cl.
*G06K 7/10* (2006.01)
*H04W 12/08* (2009.01)
*H04W 12/12* (2009.01)
*G06Q 20/34* (2012.01)
*G06Q 20/32* (2012.01)
*H04L 9/08* (2006.01)

(52) U.S. Cl.
CPC .......... *G06Q 20/341* (2013.01); *H04W 12/08* (2013.01); *H04W 12/12* (2013.01); *G07C 2009/0088* (2013.01); *G07C 2009/00412* (2013.01); *G07C 2009/00769* (2013.01); *G07C 2009/00865* (2013.01); *H04L 9/08* (2013.01)

(56) References Cited

U.S. PATENT DOCUMENTS

| | | | | |
|---|---|---|---|---|
| 2002/0114468 | A1* | 8/2002 | Nishimura | G06Q 20/341 380/270 |
| 2004/0181463 | A1* | 9/2004 | Goldthwaite | G07F 17/42 705/67 |
| 2008/0067249 | A1* | 3/2008 | Nakatsugawa | G06Q 20/32 235/451 |
| 2009/0242648 | A1* | 10/2009 | Di Sirio | G06K 7/0008 235/492 |
| 2009/0296641 | A1* | 12/2009 | Bienas | H04W 24/02 370/329 |
| 2015/0039892 | A1* | 2/2015 | Fujita | H04L 9/3226 713/171 |
| 2015/0106901 | A1* | 4/2015 | Suzuki | G06F 21/33 726/7 |

OTHER PUBLICATIONS

"Mifare Classic—Partial and Full Cloning" (Year: 2014).*
Garcia et al., "Wirelessly Pickpocketing a Mifare Classic Card", pp. 1-13 (Year: 2009).*
Mehl, "Step-by-Step Tutorial: How to Copy or Clone Access Cards and Key Fobs" (Year: 2018).*
Almeida, Marcio, "Hacking Mifare Classic Cards", Black Hat Regional Summit, Sao Paulo, Nov. 25-26, 2014, URL: https://www.blackhat.com/docs/sp-14/materials/arsenal/sp-14-Almeida-Hacking-MIFARE-Classic-Cards-Slides.pdf, 50pgs.
Gerhard de Koning Gans et al., "A Practical Attack on the MIFARE Classic", Mar. 15, 2008, available at: https://arxiv.org/abs/0803.2285, 15 pages.
International Search Report for application PCT/AU2016/050420, dated Sep. 5, 2016, 4 pages.
Liu, Ya et al., "Legitimate-reader-only attack on MIFARE Classic", Mathematical and Computer Modelling, vol. 58, Issues 1-2, Jul. 2013, pp. 219-226.
Written Opinon for application PCT/AU2016/050420, dated Sep. 5, 2016, 4 pages.

* cited by examiner

WIRELESS ACCESS TAG DUPLICATION SYSTEM AND METHOD

TECHNICAL FIELD

The present invention relates to duplication of wireless access tags.

BACKGROUND ART

Traditionally, physical locks and keys were used to restrict access to buildings and other locations. In particular, a lock was typically placed on a door, which restricted access through the door unless a corresponding key was used.

Keys and locks were generally paired based upon a physical shape of the key. In particular, a barrel of the lock was configured to operate based upon the physical shape of the key. As such, a key could readily be copied by duplicating the shape of the key.

More recently, wireless access cards have gained popularity, as they enable more refined access control. For example, wireless access cards may be used to provide access to a building during business hours, but not after hours, and may also be used to log access to the building. Such refined access control is generally not possible with traditional keys alone.

However, a problem with wireless access cards is that they are difficult to copy. For example, Mifare wireless access cards are encrypted, which prevents the cards from being easily read or duplicated. As a result, instead of being able to copy access cards, cardholders are generally required to obtain additional unique cards which are programmed to provide the same access as the original card. This is generally costly, time consuming and inconvenient.

As a result, there is a need for an improved wireless access tag duplication system and method.

It will be clearly understood that, if a prior art publication is referred to herein, this reference does not constitute an admission that the publication forms part of the common general knowledge in the art in Australia or in any other country.

SUMMARY OF INVENTION

The present invention is directed to wireless access tag duplication systems and methods, which may at least partially overcome at least one of the abovementioned disadvantages or provide the consumer with a useful or commercial choice.

With the foregoing in view, the present invention in one form, resides broadly in a wireless access tag duplication system comprising:
  a wireless access tag reader;
  a wireless access tag writer;
  a processor, coupled to the wireless access card reader and the wireless access card writer; and
  a memory, including instruction code, executable by the processor, for:
    determining a first key of a first wireless access tag;
    determining remaining keys of the first wireless access tag using nested authentication and the first key;
    reading data of the first tag using the wireless access card reader, the first key and the remaining keys and
    writing the data to a second tag, using the wireless access card writer, the first key and the remaining keys.

Preferably, the first and second wireless access tags are wireless access cards. Suitably, the wireless access cards may be Mifare wireless access cards.

Preferably, the first and second wireless access tags include a plurality of data segments, wherein each data segment is associated with an encryption key.

Preferably, the first key is determined using a database of known keys. Suitably, each key in the database may be tested on the first wireless access tag. Alternatively, the first key may be determined using a brute force search.

The brute force search may comprise attempting to read data of the card to obtain a plurality of valid responses from the card; and exhaustively selecting a key that matches the valid responses.

The valid responses may be determined according to parity bits.

Alternatively, the brute force search may consider known characteristics of the tag to reduce the number of keys that are tested.

The system may be configured to attempt to determine the first key from the database, and perform a brute force only if the first key can not be determined from the database.

Preferably, the at least one remaining key is written to the database of known keys.

Preferably, the system is configured to determine a type of the first wireless access tag. The step of determining the first key of the first wireless access tag may be performed according to the type. The card type may generally determined by attempting to read data headers of the tag.

Preferably, the system is configured to determine a frequency of the first wireless access tag. Data may be read from the wireless access card at the determined frequency.

Preferably, determining the at least one remaining key comprises authenticating a first sector of the tag with the first key, and subsequently initiating authentication of a second sector of the tag to obtain a response from the tag, wherein a key of the at least one remaining keys is determined according to the response.

Preferably, the response comprises an encrypted challenge from the tag.

Preferably, a plurality of candidate keys are generated according to the encrypted challenge, and are verified against at least one other encrypted challenge to obtain the key of the at least one remaining key.

Preferably, determining the at least one remaining key further comprises subsequently initiating authentication of all remaining sectors of the tag to obtain responses from the tag, wherein keys of the at least one remaining key are determined according to the responses.

Preferably, the system includes a display. The display may be for displaying instructions to the user. The display may be for display a progress of tag duplication to the user.

The display may comprise a touch screen display, enabling the user to interact with the system. A graphical user interface may be displayed on the display, wherein the reading of the first card is initiated from the GUI.

The system may be configured to verify contents written to the second tag. In particular, the data of the second tag may be read, and the read data may be compared with the data of the first tag.

The second tag may include a mutable card identifier field, wherein an identifier from an immutable card identifier field of the first tag is written to the mutable card identifier field of the second tag.

The second tag may comprise a tag emulator. The tag emulator may include data corresponding to a plurality of first tags.

The system may include a data interface, for enabling communication with an external system. The communication may be performed via the Internet.

The system may be authenticated online. In particular, the system may require online authentication of an account prior to reading or writing to a tag.

Preferably, a unique identifier is associated with the system and an account. The unique identifier may be determined from hardware of the system. For example, the unique identifier may be determined in part according to a CPU ID of the system.

The system may include a single tag holder associated with both the wireless access tag reader and the wireless access tag writer. Alternatively, separate tag holders are associated with the wireless access tag reader and the wireless access tag writer.

Preferably, the system is configurable to write multiple copies of a tag without re-reading the original tag.

In another form, the present invention resides broadly in a wireless access tag duplication device comprising:
 a wireless access tag reader;
 a wireless access tag writer;
 a processor, coupled to the wireless access card reader and the wireless access card writer; and
 a memory, including instruction code, executable by the processor, for:
  determining a first key of a first wireless access tag;
  determining remaining keys of the first wireless access tag using nested authentication and the first key;
  reading data of the first tag using the wireless access card reader, the first key and the remaining keys; and
  writing the data to a second tag using the wireless access card writer, the first key and the remaining keys.

In yet another form, the present invention resides broadly in a wireless access tag duplication method comprising:
 determining a first key of a first wireless access tag;
 determining remaining keys of the first wireless access tag using nested authentication and the first key;
 reading data of the first tag using a wireless access card reader, the first key and the remaining keys; and
 writing the data to a second tag using a wireless access card writer, the first key and the remaining keys.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which:

FIG. 2b illustrates a side view of the wireless access card duplication device of FIG. 2a;

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

DESCRIPTION OF EMBODIMENTS

Figure 1:
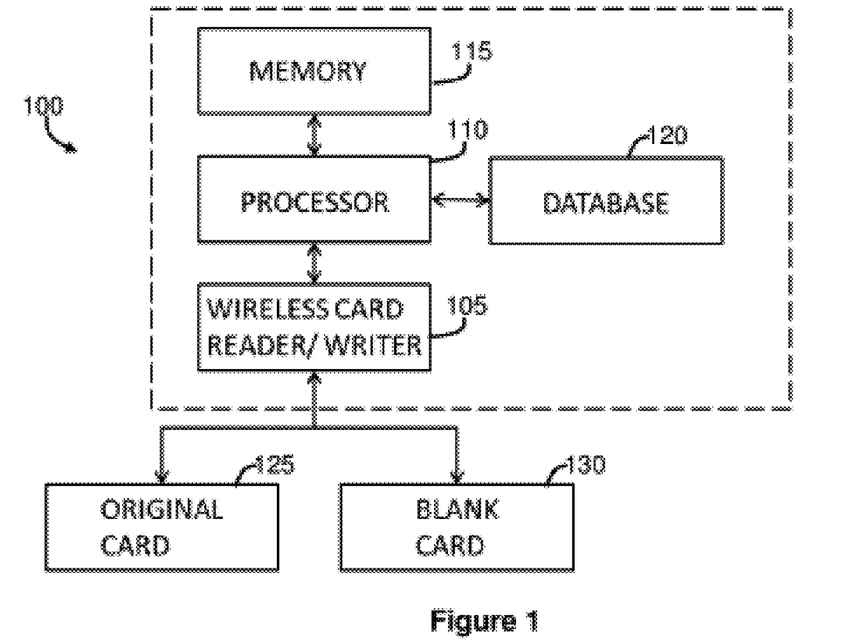
FIG. 1 illustrates a wireless access card duplication system, according to an embodiment of the present invention.

FIG. 1 illustrates a wireless access card duplication system 100, according to an embodiment of the present invention. The system 100 enables users, such as security consultants, locksmiths and/or residents, to easily and rapidly duplicate wireless access cards for keyless entry systems.

The system 100 includes a wireless card reader/writer 105, which is configured to read data from and write data to wireless access cards. Examples of such wireless access cards include the MIFARE family of cards (including the Mifare 1K, Mifare 4K, Mifare 8K, Mifare Ultralight, Mifare Ultralight C, Mifare Pro), the NTAG family of cards (including the NTAG210, NTAG212, NTAG213, NTAG215, NTAG216).

The card reader/writer 105 is coupled to a processor 110, which is in turn coupled to a memory 115 and a database 120. The memory 115 includes instruction code executable by the processor 110 for reading and writing cards, and the database 120 includes encryption keys, as discussed in further detail below.

In use, an original card 125 is read by the system 100. This includes determining encryption keys, and reading the original card 125 using the determined encryption keys.

A blank card 130 is then written with the data read from the original card 125.

As will be readily appreciated by the skilled addressee, the card reader/writer 105, the processor 110, the memory 115 and the database 120 may form part of a single device. In such case, the device may be portable, and thus used to duplicate cards on the fly.

Figure 2A:
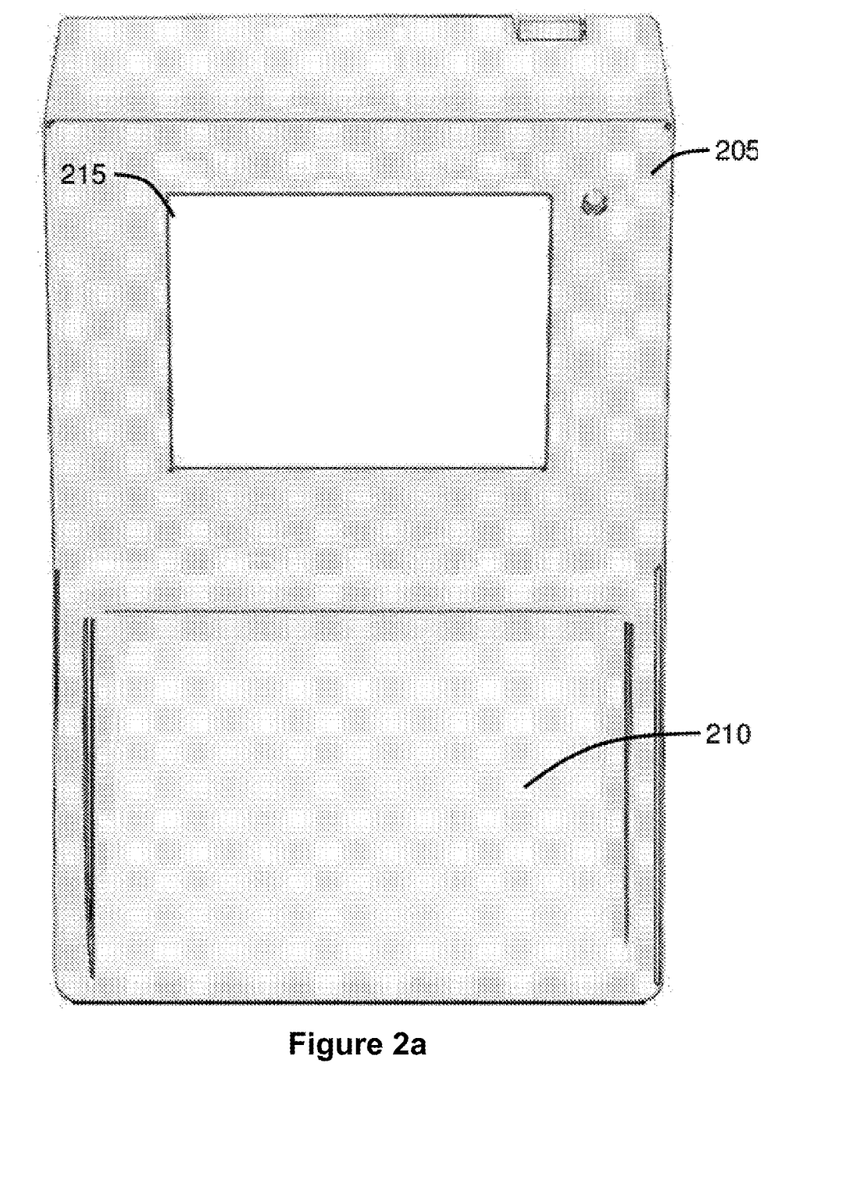
FIG. 2a illustrates a perspective view of a wireless access card duplication device, according to an embodiment of the present invention.
Figure 2B:
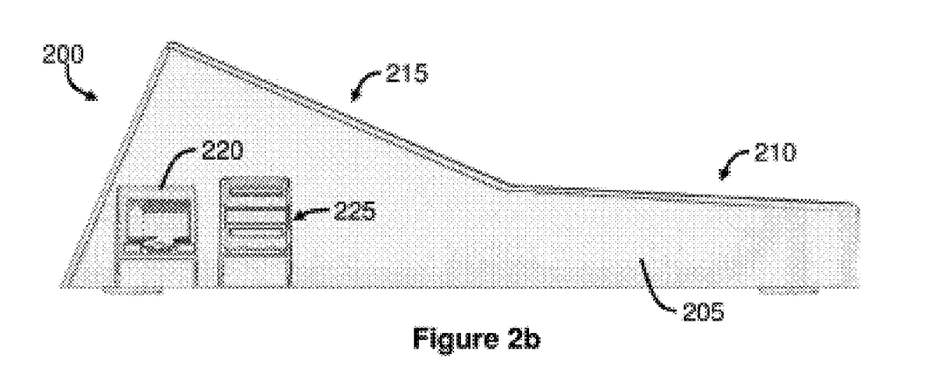

FIG. 2a illustrates a perspective view of a wireless access card duplication device 200, according to an embodiment of the present invention. FIG. 2b illustrates a side view of the wireless access card duplication device 200. The wireless access card duplication device 200 may be similar or identical to the system 100 of FIG. 1.

The device 200 comprises a housing 205, for housing a card reader/writer, such as the card reader/writer 105, a processor such as the processor 110, and a memory such as the memory 115. The housing 205 is formed of impact resistant plastic, to enable the device to be easily transported without damage.

The housing 205 defines a wireless access card holder 210, for receiving a wireless access card. The wireless access card holder 210 is located directly above the card reader/writer, and is configured to retain a card adjacent to the card reader/writer.

The device 200 further includes a touchscreen display 215, for displaying data to a user, and receiving input from the user. As discussed in further detail below, a graphical user interface may be used to enable a user to interact with the system, including to initiating reading of a card, initiate writing of a card, to provide user credentials (such as a username and/or password), or interact with the device 200 in any other suitable way.

The device 200 further includes a local area network (LAN) port in the form of an RJ-45 Ethernet socket 220, and a pair of universal serial bus (USB) ports 225. The LAN port and the USB ports may be used to communicate with external systems, peripherals, or the like. For example, the LAN port may be coupled to a router providing Internet connectivity to the device 200. Similarly, the USB ports 225 may be used to couple a wireless modem, a keyboard, or any other suitable peripheral to the device 200.

In use, the user places the card to be copied on the wireless access card holder 210, and initiates reading of the card data using the touchscreen display 215. In particular, a graphical user interface (GUI) is displayed, which includes a "start scanning" virtual button. In short, the GUI guides the user through the card duplication process, Upon selection of the start scanning button, the data of the card is read, as discussed in further detail below, and a progress bar is presented to the user on the touchscreen display 215. The progress bar provides instant feedback to the user that the card is being scanned, which helps prevent the card from being removed from the wireless access card holder 210 prematurely.

Upon completion of the reading of the data from the card, an indication that the reading is complete, and that the user may remove the card, is displayed on the touchscreen display 215. The graphical user interface then instructs the user to place a blank card on the wireless access card holder 210, and after which writing of the data to the blank card is initiated.

A progress bar is presented to the user on the touchscreen display 215, and upon completion of writing to the card, a message is displayed to the user indicating same. As such, the user is made aware of the progress of the writing of the card, as it is happening, which alleviates the problem of the user prematurely removing the card from the wireless access card holder 210, and thus preventing the writing of the card to complete.

As discussed in further detail below, the device 200 may attempt to verify data written to the card. According to certain embodiments, the device 200 automatically reads the written card upon completion, and compares the written data to the data on record, to verify that all data has been written to the card correctly.

According to other embodiments (not illustrated), the device 200 includes first and second wireless access card holders, the first for the card being copied and second for the blank card. This enables completely unattended duplication as the device is able to read the card being copied and automatically write the data therefrom to the blank card.

The device 200 is compact and portable. As such, the device may be transported and used where required, including on-site, in portable offices, or the like. Alternatively, the device may be attached to a counter, a desk or the like, to prevent unwanted movement.

Figure 3:
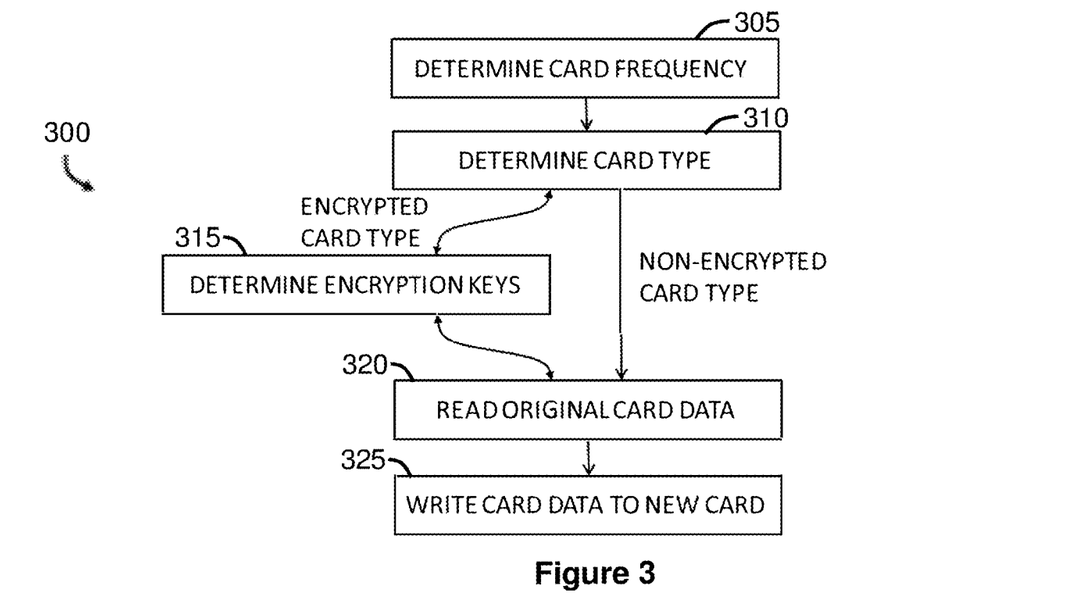
FIG. 3 illustrates a wireless access card duplication method, according to an embodiment of the present invention.

FIG. 3 illustrates a wireless access card duplication method 300, according to an embodiment of the present invention. The card duplication method 300 may be incorporated into the system 100 of FIG. 1 and/or the device 200 of FIG. 2 to provide card duplication functionality.

At step 305, a frequency of the card is determined. Typically, access cards operate at either 125 kHz or 13.56 MHz, and as such, these frequencies are generally tested.

At step 310, a type of the card is determined. Examples of card types include the Mifare 1K card, as discussed above. The card type is generally determined by attempting to read headers of the card using the frequency determined earlier and known data protocols.

Figure 4:
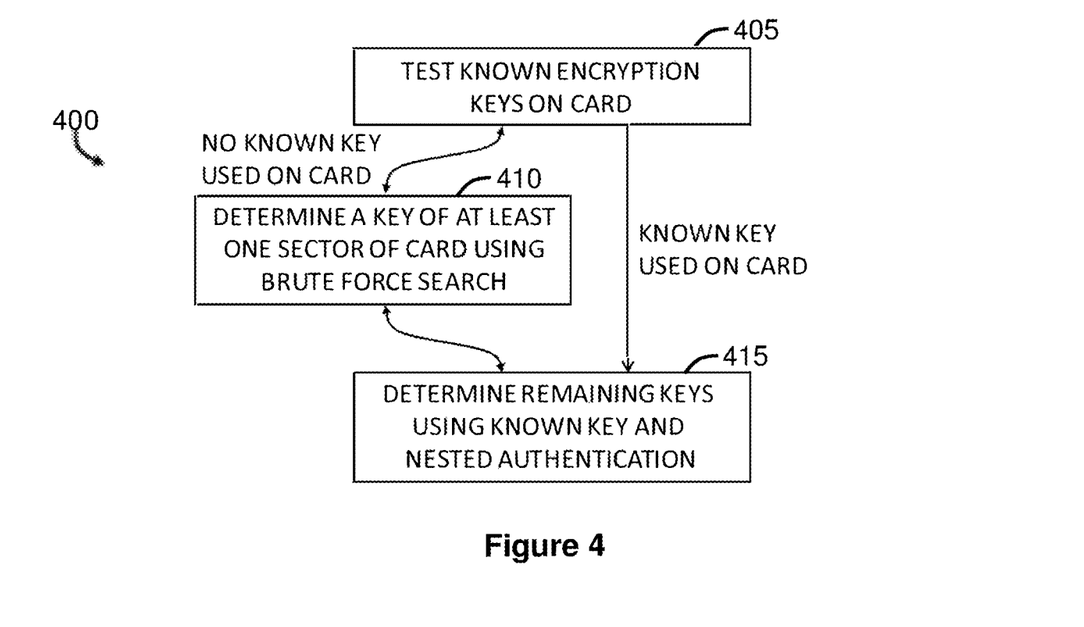
FIG. 4 illustrates a method of determining encryption keys of a wireless access card, according to an embodiment of the present invention.

If the card is an encrypted card type, encryptions keys of the card are determined at step 315. In particular, keys used to encrypt data on the card are determined in this step, which enables retrieval of the data of the card. FIG. 4, below, provides further details of a method to determine encryption keys of the card that may be used together with the method 300.

At step 320, the data of the card is read. As will be readily appreciated by the skilled addressee, if the card type is a non-encrypted card type, the method may proceed directly from step 310 to 320, without determining any encryption keys, as this is not required to read the data.

The card may comprise a plurality of data segments, and each data segment may be read individually. Each data segment may also be associated with a different encryption key. In the case of the Mifare Classic wireless access card, for example, the memory is divided into sectors, each of the sectors having 64 bytes and having its own 48-bit encryption key.

At step 325, the data from step 320 is written to the card. In case the card is encrypted, the data may be written to the card using the encryption key identified in step 315. The new card may then be used in place of the original card.

According to certain embodiments, the data from the original card includes an identifier field, which contains an identifier that is unique to the card and immutable. In such case, the new card may includes a mutable identifier field, which enables the identifier of the original card to be written thereto, allowing for perfect duplicates of the original card to be made.

According to certain embodiments, the data of the new card is read, and the read data of the new card is compared with the read data of the old card. If any discrepancies are found, a message may be displayed to the user. In some embodiments, the card may be automatically cleared and rewritten.

FIG. 4 illustrates a method 400 of determining encryption keys of a wireless access card, according to an embodiment of the present invention. As discussed above, the method 400 may be used to determine the encryption keys in step 315 of the method 300.

The memory of the Mifare Classic wireless access card, for example, is divided into sectors, each of the sectors having its own 48-bit encryption key. To read data from a specific sector, the reader must first authenticate with the sector using the encryption key associated with that sector. As such, to be able to read the entire wireless access card, all encryption keys must be known.

At step 405, it is determined if one of the encryption keys of the card is in a database of keys. In particular, the database is stored and maintained for known keys of wireless access cards, and as a new key is determined, it is added to the database.

If no known key is used on the wireless access card, a key of the access card is determined using a brute force search at step 410.

In particular, read attempts are made to a sector using random data as the key and parity bits. When the parity bits are correct, which is a $\frac{1}{256}$ chance for 8 parity bits, the wireless access card responds with an encrypted 4-bit error code. By repeating the process, sufficient data can be obtained to enable a brute force attack, and each key combination can be tested to determine which produces the correct parity bits and received response for the above obtained data.

The skilled addressee will readily appreciate that the brute force attack need not consider each key combination, but may instead utilise known characteristic of the card to reduce the number of keys considered, and thus increase a speed of the method.

As an illustrative example, predictions may be made in relation to the certain bits of a bitstream, if it is found that some bits do not depend on other bits of the bitstream, which can reduce the number of keys required to be tested. Similarly, small levels of variability in the generation of the bitstream may also be exploited to reduce the number of keys required to be tested.

As a brute force attack is processor intensive, it is desirable to avoid this step. As the collection of pre-known keys gets larger, the chance of being able to avoid a brute force search is reduced.

At step 415, the remaining keys are determined using nested authentication and either the pre-known or the key determined in step 410.

In the case of Mifare Classic wireless access card, mentioned above, a known encryption key of one sector can be used to obtain information about the encryption key of another sector. In particular, a known encryption key may be used to authenticate the sector with which it is associated, and subsequent attempts to authenticate another sector provide about 32 bits of information about the secret key of that sector. This is due to the fact that the random number generator has only a 16-bit state, because parity bits of the card leak information, and because the tag's random number generator runs in sync with the communication timing.

Once the known encryption key us used to authenticate the first sector, the subsequent attempt to authenticate the second sector results in a challenge of the tag being sent encrypted. Then, a plurality of candidate keys, in this case $2^{16}$ (just over 65,000) candidate keys, are generated based upon the challenge and are checked using a second and possibly third authentication attempt. All candidate keys can generally be tested in under a second using ordinary hardware.

In most cases, a candidate key can be determined based upon two authentication attempts, however in some cases a third authentication attempt may be required if the intersection of the first and second attempts results in more than one key.

The above process is then repeated for all remaining sectors of the card.

While step 405 is illustrated prior to step 410 in the process flow, the skilled addressee will readily appreciate that step 410 may be performed in parallel to step 405. In such case, no delay is occurred by waiting for step 405 to be completed prior to initiating step 410.

An example of determining keys of a Mifare Classic wireless access card is outlined in Flavio D. Garcia, Peter Rossum, Roel Verdult, and Ronny Wichers Schreur "Wirelessly Pickpocketing a Mifare Classic Card", IEEE Symposium on Security and Privacy, IEEE, 2009, which is incorporated herein by reference.

According to certain embodiments, known keys are grouped in the database by statistical relevance, to reduce the time of the key testing process. Improvements in the key searching can be achieved due to the fact that generally, each company that produces badges uses their own combination of keys.

According to certain embodiments, the system is coupled to an online payment system. In such case, a subscription may be employed where each copy made incurs a cost, and/or where use of the system is paid per day, week, month or similar. As an illustrative example, a user may be required to pay a monthly subscription fee as well as an individual card copying fee per card that is copied by the system.

According to certain embodiments, the wireless access card duplication device includes a unique identifier that is associated with an account. The unique identifier may be determined from a central processing unit (CPU) identifier (ID) associated with the device, or by any other suitable means. As such, the wireless access card duplication device may identify itself online without necessarily requiring user details. Alternatively, a username and password may be employed as authentication means.

The system may require internet access to enable the device to boot, or to enable the device to be able to write a card. This is particularly advantageous when subscription models may change over time, as the user may be forced to update the system to continue using baseline functionality of the device.

Such subscription models may be used to subsidise the cost of the wireless access card duplication device.

According to certain embodiments, each new card is associated with a unique identifier, to prevent the use of counterfeit cards. Validation is performed on new cards prior to data being written to the new card, and data is only written upon successful validation.

In particular, a database of valid cards, and their associated identifiers, is maintained centrally, and the respective identifier is stored on each valid card. When a user attempts to use a new card with the system, the identifier is read from the card, and compared with the valid identifiers in the database to ensure that the badge is genuine. If the identifier is genuine, it is then removed from the database (or marked as "used"), so that it cannot be used to subsequently verify other cards, to prevent the copying of multiple badges with a single identifier.

In other embodiments, the blank cards are rewritable. In such case, to prevent fraudulent blank cards from being used with the system, while enabling legitimate cards to be written to multiple times, each time a card is written, a fingerprint (or hash) is generated based upon the card data and the card identifier, which is saved in the database. The fingerprint is then later used to verify that the same card is being rewritten.

Alternatively, offline variations of the system may be provided, where a one-off fee is provided to utilise the technology indefinitely. This is particularly advantageous where large numbers of cards are being copied, or where internet access may not be available.

According to certain embodiments, the system may be configured to provide multiple copies of the same card, without requiring that the card be read multiple times. In such case, the data of the card is stored in memory and written as many times as required.

According to certain embodiments, the system enables remote administration, for example to provide maintenance or support. In particular, each device can be accessed remotely, via a reverse secure shell (SSH) tunnel, allowing a technician to remotely control the device to perform maintenance or provide support.

Similarly, software updates may be provided automatically or manually over the Internet, or by a software update on a USB key. The updates can add functionality to the device, improve performance, correct bugs, and allow for a full system recovery in case of software failure.

The system may be at least partly cloud based. For example, data may be sent to a remote server to determine key data, and the keys may be returned to the device for decoding. This is particularly advantageous for processor intensive activities such as brute force attacks.

The term "card" is primarily used in the specification above. However, wireless tags need not have the form of a traditional card, but can instead be any suitable shape. As an illustrative example, a wireless tag may be key-fob shaped.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A wireless access tag duplication system comprising: a wireless access tag reader;
   a wireless access tag writer;
   a processor, coupled to the wireless access tag reader and the wireless access tag writer; and
   a memory, including instruction code, executable by the processor, for: determining a first key of a first wireless access tag;
   determining remaining keys of the first wireless access tag using nested authentication and the first key;
   reading data of the first wireless access tag using the wireless access tag reader, the first key and the remaining keys; and
   writing the data to a second wireless access tag using the wireless access tag writer, the first key and the remaining keys,
   wherein the processor is further configured to require online authentication prior to reading or writing to a tag using a unique identifier associated with the system.

2. The system of claim 1, wherein the first and second wireless access tags comprise wireless access cards.

3. The system of claim 1, wherein the first and second wireless access tags include a plurality of data segments, wherein each data segment is associated with an encryption key.

4. The system of claim 3, wherein the first key of the first wireless access tag is determined using a brute force search on the first wireless access tag, wherein the brute force search comprises attempting to read data of the first wireless access tag to obtain a plurality of valid responses from the first wireless access tag; and exhaustively selecting a key that matches the valid responses according to parity bits.

5. The system of claim 4, wherein the brute force search is performed according to known characteristics of the first wireless access tag to reduce a number of keys that are tested.

6. The system of claim 5, wherein the processor is configured to determine the first key of the first wireless access tag from a database of known keys, and perform the brute force search in response to determining that the first key of the first wireless access tag is not in the database.

7. The system of claim 1, wherein determining the remaining keys of the first wireless access tag comprises authenticating a first sector of the first wireless access tag with the first key of the first wireless access tag, and subsequently initiating authentication of a second sector of the first wireless access tag to obtain a response from the first wireless access tag, wherein a key of the remaining keys is determined according to the response.

8. The system of claim 7, wherein the response comprises an encrypted challenge from the first wireless access tag.

9. The system of claim 8, wherein a plurality of candidate keys are generated according to the encrypted challenge, and are verified against at least one other encrypted challenge to obtain the key of the remaining keys.

10. The system of claim 9, wherein determining the remaining keys comprises initiating authentication of all remaining sectors of the first wireless access tag to obtain responses from the first wireless access tag, wherein keys of the remaining keys are determined according to the responses.

11. The system of claim 1, further comprising a display, for displaying instructions to a user, wherein the display is further configured to display a progress of tag duplication to the user.

12. The system of claim 1, wherein the processor is further configured to verify contents written to the second wireless access tag.

13. The system of claim 1, wherein the second wireless access tag includes a mutable card identifier field, and wherein an identifier from an immutable card identifier field of the first wireless access tag is written to the mutable card identifier field of the second wireless access tag.

14. The system of claim 1, wherein the second wireless access tag comprises a tag emulator, the tag emulator including data corresponding to a plurality of first wireless access tags.

15. The system of claim 1, further comprising a data interface, for enabling communication with an external system.

16. The system of claim 1, further including a single tag holder associated with both the wireless access tag reader and the wireless access tag writer.

17. The system of claim 1, further including separate tag holders associated with the wireless access tag reader and the wireless access tag writer respectively.

18. The system of claim 1, wherein the wireless access tag writer is configurable to write multiple copies of a tag without the wireless access tag reader re-reading the first wireless access tag.

19. A wireless access tag duplication device comprising:
   a wireless access tag reader; a wireless access tag writer;
   a processor, coupled to the wireless access tag reader and the wireless access tag writer; and
   a memory, including instruction code, executable by the processor, for: determining a first key of a first wireless access tag;
   determining remaining keys of the first wireless access tag using nested authentication and the first key;
   reading data of the first wireless access tag using the wireless access tag reader, the first key and the remaining keys; and
   writing the data to a second wires access tag using the wireless access tag writer, the first key and the remaining keys, wherein the processor is further configured to require online authentication prior to reading or writing to a tag using a unique identifier.

* * * * *